(12) United States Patent
Liu

(10) Patent No.: US 9,941,816 B2
(45) Date of Patent: Apr. 10, 2018

(54) H-BRIDGE BIDIRECTIONAL CURRENT SENSING CIRCUIT

(71) Applicant: Chengdu Monolithic Power Systems Co., Ltd., Chengdu (CN)

(72) Inventor: Mingliang Liu, Chengdu (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 0 days.

(21) Appl. No.: 15/630,936

(22) Filed: Jun. 22, 2017

(65) Prior Publication Data

US 2017/0370971 A1    Dec. 28, 2017

(30) Foreign Application Priority Data

Jun. 27, 2016    (CN) .......................... 2016 1 0482954

(51) Int. Cl.
*H02M 7/537*    (2006.01)
*H02M 1/00*    (2006.01)

(52) U.S. Cl.
CPC .... *H02M 7/537* (2013.01); *H02M 2001/0009* (2013.01)

(58) Field of Classification Search
CPC .................. H02M 7/537; H02M 2001/0009
See application file for complete search history.

(56) References Cited

U.S. PATENT DOCUMENTS

| 4,325,095 A * | 4/1982 | Hart .......................... H02P 6/12 |
| | | 361/23 |
| 5,204,594 A * | 4/1993 | Carobolante ........... G05F 1/575 |
| | | 318/400.04 |
| 2006/0261884 A1 * | 11/2006 | Gammie ............. H03F 3/45192 |
| | | 330/9 |
| 2013/0082689 A1 | 4/2013 | Xu et al. |
| 2015/0189710 A1 | 7/2015 | Lin et al. |
| 2017/0141713 A1 * | 5/2017 | Mori .......................... H02P 6/14 |

OTHER PUBLICATIONS

U.S. Appl. No. 15/267,123, filed Sep. 15, 2016, Monolithic Power Systems.

* cited by examiner

*Primary Examiner* — Gary L Laxton
*Assistant Examiner* — Peter Novak
(74) *Attorney, Agent, or Firm* — Perkins Coie LLP

(57) ABSTRACT

A bidirectional current sensing circuit includes: a sensing resistor coupled between a load and a reference ground, a first and second auto-zero amplifiers coupled to the sensing resistor to sense the voltage across the sensing resistor, and an output transistor. One of the first and second auto-zero amplifiers operates in an output mode and the other of the first and second auto-zero amplifiers operates in a zeroing mode according to a polarity of a voltage across the sensing resistor. The output transistor has a first terminal providing a current sensing signal indicating a load current, a second terminal electrically connected to an inverting terminal of the one of the first and second auto-zero amplifiers operating in the output mode, and a control terminal electrically connected to an output terminal of the one of the first and second auto-zero amplifiers operating in the output mode.

19 Claims, 5 Drawing Sheets

US 9,941,816 B2

H-BRIDGE BIDIRECTIONAL CURRENT SENSING CIRCUIT

CROSS-REFERENCE TO RELATED APPLICATIONS

This application claims the benefit of CN application 201610482954.X, filed on Jun. 27, 2016, and incorporated herein by reference.

TECHNICAL FIELD

The present invention generally relates to electrical circuit, and more specifically relates to a bidirectional current sensing circuit.

BACKGROUND

An H-bridge circuit is powered by a single supply and is generally used to drive a motor or another load with bidirectional operation. FIG. 1 schematically illustrates an H-bridge circuit. As shown in FIG. 1, the H-bridge circuit comprises a first switch pair (M1 and M4) and a second switch pair (M2 and M3). When the first switch pair is turned ON, and the second switch pair is turned OFF, and the voltage at the terminal A is higher than the voltage at the terminal B, a positive current is flowing through the load with a direction (e.g. clockwise). When the second switch pair is turned ON, and the first switch pair is turned OFF, then the voltage at the terminal B is higher than the voltage at the terminal A, a negative current is flowing through the load with the opposite direction (e.g. anticlockwise).

The H-bridge circuit typically requires a load current to be sensed in some way, and the sensed load current is provided to a controller of the H-bridge circuit. Conventionally, the load current is sensed in a way that connects a sensing resistor $R_{SENSE}$ in series in the H-bridge, thereby the voltage across the sensing resistor $R_{SENSE}$ is used to indicate the load current $i_{LOAD}$.

FIGS. 2-4 schematically illustrate current sensing circuits that are used to sense the load current of H-bridge circuit, respectively. A low side current sensing circuit is shown in FIG. 2, a sensing resistor $R_{SENSE}$ is coupled between a load and a reference ground. A high side current sensing circuit is shown in FIG. 3, a sensing resistor $R_{SENSE}$ is coupled between a load and an input supply VIN. FIG. 5 schematically illustrates waveform of the current sensing circuit shown in FIG. 3. Since the load current flowing upon the sensing resistor $R_{SENSE}$ are in opposite directions, a voltage across the sensing resistor $R_{SENSE}$ are discontinuous AC pulses. It would be difficult and complex to process the sensed result for a following work.

In prior art, a current sensing circuit shown in FIG. 4 is used to sense a bidirectional load current. As shown in FIG. 4, a sensing resistor $R_{SENSE}$ is coupled in series with a load. A differential amplifier AMP is used to amplify a voltage across the sensing resistor $R_{SENSE}$. However, this differential sensing way that introduces a significant amount of common mode noise into the sensing result, thereby producing a low signal-to-noise ratio (SNR) which is undesirable.

Thus, it would be advantage to provide a current sensing circuit which is capable of sensing a bidirectional current with a much higher SNR than conventional circuits.

SUMMARY

In view of the above requirements, there has been provided, in accordance with an embodiment of the present disclosure, a bidirectional current sensing circuit. The bidirectional current sensing circuit comprising: a sensing resistor, a voltage polarity indicating circuit having an output terminal configured to provide a square signal as an indication as to whether the voltage across the sensing resistor is positive or negative, a first and second auto-zero amplifiers and an output transistor. The sensing resistor has a first terminal coupled to a load and a second terminal coupled to a reference ground. The first auto-zero amplifier has a non-inverting terminal coupled to the first terminal of the sensing resistor through a first resistor, an inverting terminal coupled to the second terminal of the sensing resistor through a second resistor, a clock input terminal coupled to the output terminal of the voltage polarity indicating circuit, and an output terminal. The second auto-zero amplifier has a non-inverting terminal coupled to the inverting terminal of the first auto-zero amplifier, an inverting terminal coupled to the non-inverting terminal of the first auto-zero amplifier, a clock input terminal coupled to the output terminal of the voltage polarity indicating circuit through an inverter, and an output terminal. One of the first and second auto-zero amplifiers is configured to operate in an output mode and the other of the first and second auto-zero amplifiers is configured to operate in a zeroing mode according to the voltage polarity of the voltage across the sensing resistor. The output transistor has a first terminal coupled to an output circuit to provide a current sensing signal indicating the load current, a second terminal electrically connected to the inverting terminal of the one of the first and second auto-zero amplifiers operating in the output mode, and a control terminal electrically connected to the output terminal of the one of the first and second auto-zero amplifiers operating in the output mode.

BRIEF DESCRIPTION OF THE DRAWING

The present invention can be further understood with reference to the following detailed description and the appended drawings.

The use of the same reference label in different drawings indicates the same or like components.

DETAILED DESCRIPTION

Various embodiments of the technology will now be described. In the following description, some specific details, such as example circuits and example values for these circuit components, devices or process, are included to provide a thorough understanding of embodiments. One skilled in the relevant art will recognize, however, that the technology can be practiced without one or more specific details, or with other methods components, materials, etc.

Throughout the specification, the terms "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. Moreover, the drawings are only for illustration purpose. Usually, these drawings are not necessarily drawn to scale. Persons of ordinary skill in the art will appreciate that the terms "coupled" or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

Figure 6:
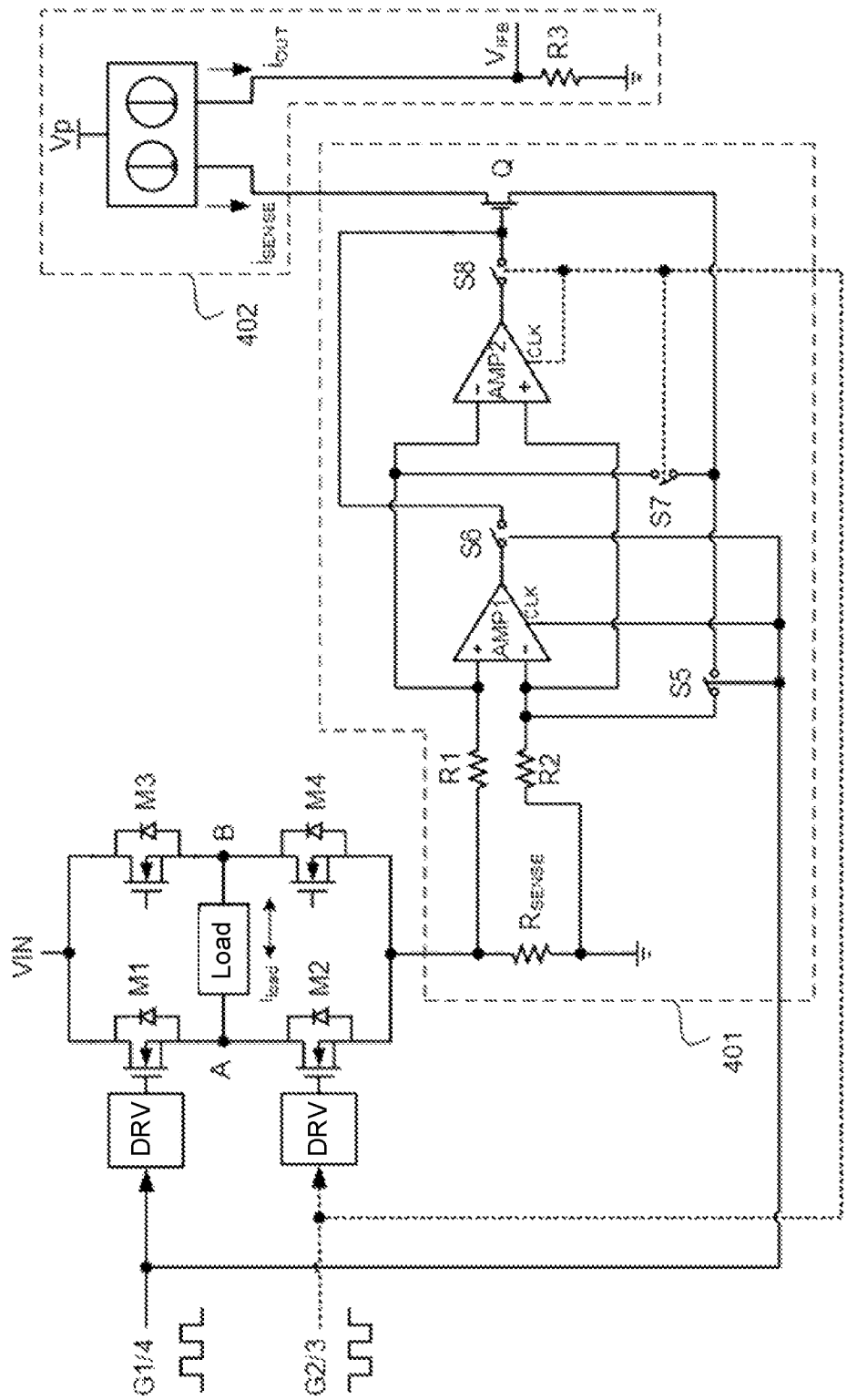
FIG. 6 schematically illustrates a current sensing circuit 401 for sensing a load current of an H-bridge circuit in accordance with one embodiment of the present invention.

FIG. 6 schematically illustrates a current sensing circuit 401 for sensing load current of an H-bridge circuit in accordance with one embodiment of the present invention. The current sensing circuit 401 is configured to sense a bidirectional load current $i_{Load}$ of the H-bridge circuit. The H-bridge circuit comprises switches M1-M4, each switch is controlled by a control signal, wherein a first switch M1 and a fourth switch M4 are combined as a first switch pair which is controlled by a first control signal G1/4, a second switch M2 and a third switch M3 are combined as a second switch pair which is controlled by a second control signal G2/3. The H-bridge circuit is configured to convert a DC input voltage $V_{IN}$ into an output voltage for a load by the way that alternatively turns ON and turns OFF of the first switch pair and the second switch pair.

In one embodiment, the H-bridge circuit further comprises driver circuits DRV. The driver circuits DRV are configured to receive the control signals G1-G4 and output driving signals to the four switches M1-M4, respectively.

Sensing the load current correctly is the key to obtain a feedback loop control of the H-bridge circuit. As described previously, since current pulses flowing upon the load of the H-bridge circuit are bidirectional, thus this requires a current sensing circuit which is capable of sensing the bidirectional current.

As shown in FIG. 6, the current sensing circuit 401 comprises a sensing resistor $R_{SENSE}$, a first amplifier AMP1, a second amplifier AMP2 and an output transistor Q. The sensing resistor $R_{SENSE}$ has a first terminal and a second terminal, wherein the first terminal is coupled to the load through the second switch M2 or the fourth switch M4, the second terminal is coupled to a reference ground.

The first amplifier AMP1 and the second amplifier AMP2 are both the auto-zero amplifiers, which can be configured to operate in one of an output mode and a zeroing mode. In the output mode of the auto-zero amplifier, an error signal is saved in a holding circuit, then in the zeroing mode of the auto-zero amplifier, the error signal previously saved is added to a main amplifier unit of the auto-zero amplifier to cancel out the offset. Traditionally, the auto-zero amplifier is configured to operate in one of the output mode and the zeroing mode, and this switching is accomplished by applying a clock signal generated by a timer to the internal analog switch elements of the auto-zero amplifier.

However, according to one embodiment of the invention, a first clock signal of the first amplifier AMP1 is the first control signal G1/4, a second clock signal of the second amplifier AMP2 is the second control signal G2/3.

Figure 1:
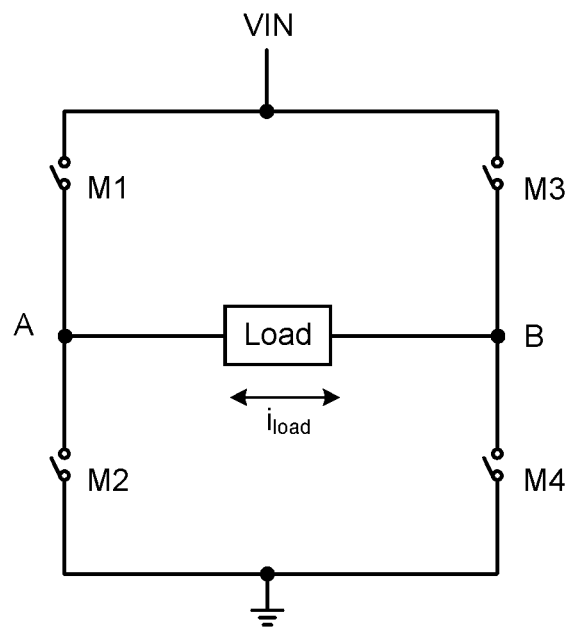
FIG. 1 schematically illustrates an H-bridge circuit.
Figure 2:
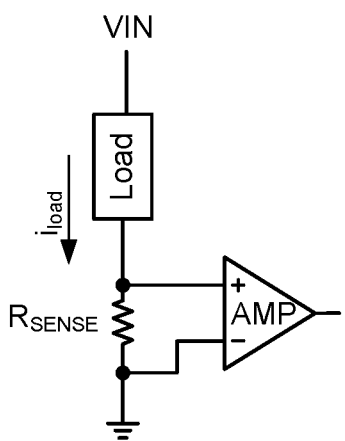
FIGS. 2-4 schematically illustrate current sensing circuits that are used to sense a load current of H-bridge circuit, respectively.
Figure 3:
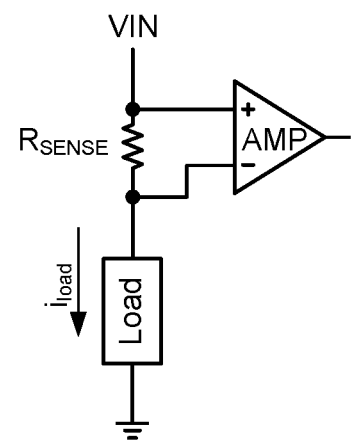
Figure 4:
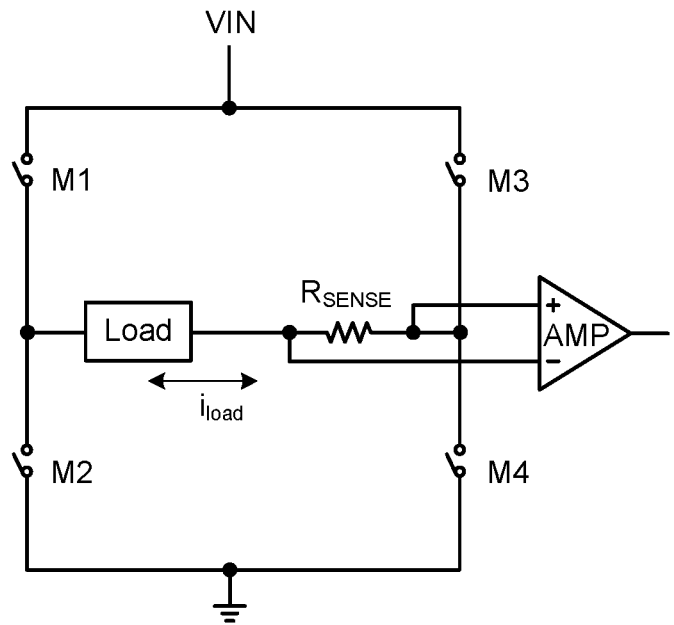
Figure 5:
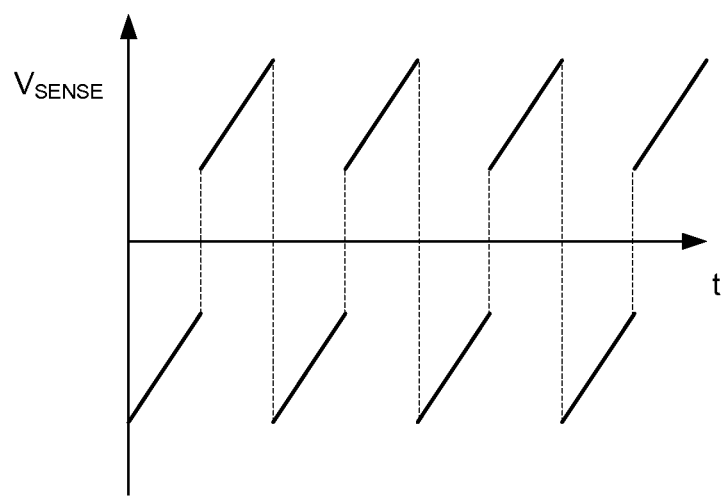
FIG. 5 schematically illustrates waveform for the current sensing circuit shown in FIG. 3.

As shown in FIG. 4, the first amplifier AMP1 is configured to receive a positive voltage across the sensing resistor $R_{SENSE}$. The first amplifier AMP1 has a non-inverting terminal, an inverting terminal, a clock input terminal and an output terminal, wherein the non-inverting terminal is coupled to the first terminal of the sensing resistor $R_{SENSE}$ through a first resistor R1, the inverting terminal is coupled to the second terminal of the sensing resistor $R_{SENSE}$ through a second resistor R2, the clock input terminal is coupled to the first control signal G1/4 that is functional as the first clock signal to control the first amplifier AMP1 operating in one of the output mode and the zeroing mode. In one embodiment, when the first control signal G1/4 is at the high level, the first amplifier AMP1 is configured to operate in the output mode, and when the first control signal G1/4 is at the low level, the first amplifier AMP1 is configured to operate in the zeroing mode.

The second amplifier AMP2 is configured to receive a negative voltage across the sensing resistor $R_{SENSE}$. The second amplifier AMP2 has a non-inverting terminal, an inverting terminal, a clock input terminal and an output terminal, wherein the non-inverting terminal is coupled to the inverting terminal of the first amplifier AMP1, the inverting terminal is coupled to the non-inverting terminal of the first amplifier AMP1, the clock input terminal is coupled to receive the second control signal G2/3 which is functional as the second clock signal to control the second amplifier AMP2 operating in one of the output mode and the zeroing mode.

The output transistor Q is configured to provide a path to an output circuit 402 for a current sensing signal $i_{SENSE}$ indicating the load current $i_{LOAD}$. In the embodiment of FIG. 6, the output transistor Q comprises a field effect transistor. A drain terminal of the output transistor Q is coupled to the output circuit 402 to provide the current sensing signal $i_{SENSE}$, a source terminal is electrically connected to the inverting terminal of the amplifier in the output mode, and a gate terminal is electrically connected to the output terminal of the amplifier in the output mode. In another embodiment, the output transistor Q comprises a bipolar transistor.

According to one embodiment of the invention, the current sensing circuit 401 further comprises a switch array. The switch array comprises a first group of switches and a second group of switches. The first group of switches is controlled by the first control signal G1/4 and the second group of switches is controlled by the second control signal G2/3.

The first group of switches comprises a fifth switch S5 and a sixth switch S6, a first terminal of the fifth switch S5 is coupled to the inverting terminal of the first amplifier AMP1, a second terminal of the fifth switch S5 is coupled to the source terminal of the output transistor Q, a first terminal of the sixth switch S6 is coupled to the output terminal of the first amplifier AMP1, a second terminal of the sixth switch S6 is coupled to the gate terminal of the output transistor Q, a control terminal of the fifth switch S5 and a control terminal of the sixth switch S6 are coupled to the first control signal G1/4. The second group of switches comprises a seventh switch S7 and an eighth switch S8, a first terminal of the seventh switch S7 is coupled to the inverting terminal of the second amplifier AMP2, a second terminal of the seventh switch S7 is coupled to the source terminal of the output transistor Q, a first terminal of the eighth switch S8 is coupled to the output terminal of the second amplifier AMP2, a second terminal of the eighth switch S8 is coupled to the gate terminal of the output transistor Q, a control terminal of the seventh switch S7 and a control terminal of the eighth switch S8 are coupled to the second control signal G2/3.

In one embodiment, when the first control signal G1/4 is at the high level and is valid, and the second control signal G2/3 is at the low level and is invalid, the first group of switches is turned ON and the second group of switches is turned OFF. The first amplifier AMP1 is configured to operate in the output mode, the output terminal of the first amplifier AMP1 is electrically connected to the gate terminal of the output transistor Q, the inverting terminal of the first amplifier AMP1 is electrically connected to the source terminal of the output transistor Q. When the second control signal G2/3 is at the high level and is valid, and the first control signal G1/4 is at the low level and is invalid, and the second group of switches is turned ON and the first group of switches is turned OFF, the second amplifier AMP2 is configured to operate in the output mode. The output terminal of the second amplifier AMP2 is electrically connected to the gate terminal of the output transistor Q, the inverting terminal of the second amplifier AMP2 is electrically connected to the source terminal of the output transistor Q.

The output circuit 402 is configured to further amplify or process the current sensing signal $i_{SENSE}$ indicating the load current $i_{LOAD}$, in order to provide a feedback signal for further operation. In one embodiment, the output circuit 402 comprises a current mirror circuit. The current mirror circuit has an input terminal, a power terminal and an output terminal, wherein the input terminal is coupled to the drain terminal of the output transistor Q to receive the current sensing signal $i_{SENSE}$, the power terminal is coupled to a power supply Vp, and the output terminal is coupled to the reference ground through a third resistor R3 and provide an output current signal $i_{OUT}$. In one embodiment, the voltage $V_{IFB}$ across the third resistor R3 can be used as a feedback signal related to the load current $i_{LOAD}$. The feedback signal $V_{IFB}$ is provided to a control circuit of the H-bridge circuit.

In one embodiment, all the components of the current sensing circuit 401 are integrated in one chip. In another embodiment, every component of the current sensing circuit 401 is integrated in one chip except for the sensing resistor $R_{SENSE}$.

Figure 7:
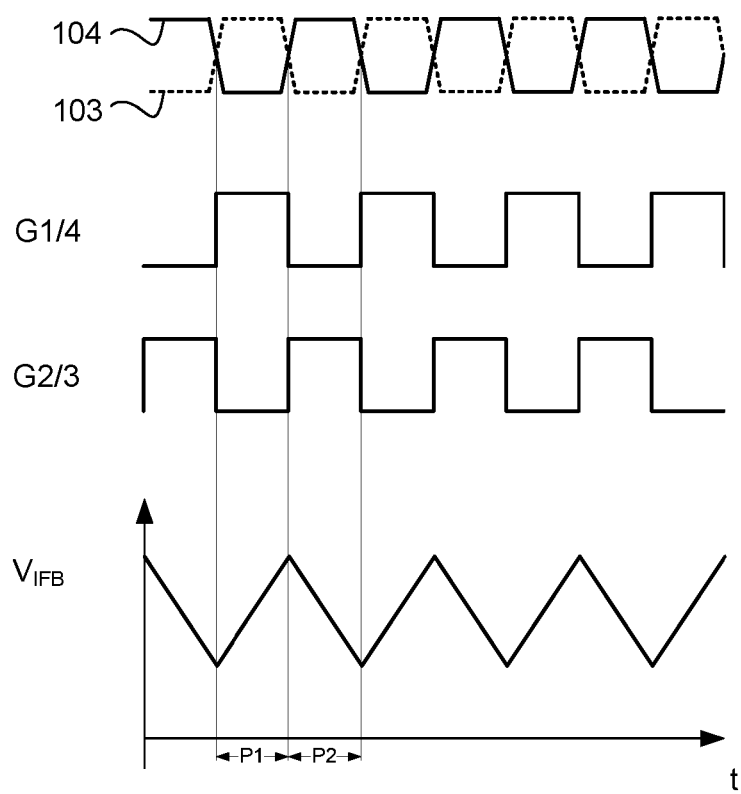
FIG. 7 schematically illustrates waveform of the current sensing circuit 401 shown in FIG. 6 according to one embodiment of the present invention.

FIG. 7 schematically illustrates waveform of the current sensing circuit 401 shown in FIG. 6 according to one embodiment of the present invention. As shown in FIG. 7, the first control signal G1/4 and the second control signal G2/3 are logic complementary. This means when the first switch pair is turned ON, the second switch pair is turned OFF undoubtedly. However, persons of ordinary skill in the art will appreciate that a dead time is provided generally between the first control signal G1/4 and the second control signal G2/3 to prevent cross conduction.

As shown in FIG. 7, during a period P1, the first control signal G1/4 is at the high level, the first switch pair is turned ON, the voltage at terminal A (labeled as 103) is higher than the voltage at the terminal B (labeled as 104), the voltage VAB across the load is positive, the voltage Vab across the sensing resistor $R_{SENSE}$ is positive, too. The first amplifier AMP1 is configured to operate in the output mode, the voltage Vab across the sensing resistor $R_{SENSE}$ is sensed and the current sensing signal $i_{SENSE}$ is provided to the output circuit 402 through the output transistor Q, a feedback signal $V_{IFB}$ is shown in FIG. 7. In the meantime, the second control signal G2/3 is at the low level and the second amplifier AMP2 is configured to operate in the zeroing mode.

During a period P2, the second control signal G2/3 is at the high level, the second switch pair is turned ON, the voltage at terminal A (labeled as 103) is smaller than the voltage at the terminal B (labeled as 104), the voltage VAB across the load is negative, the voltage Vab across the sensing resistor $R_{SENSE}$ is negative, too. The second amplifier AMP2 is configured to operate in the output mode, the feedback signal $W_{IFB}$ is a DC signal and easy to process for further operation. In the meantime, the first control signal G1/4 is at the low level and the first amplifier AMP1 is configured to operate in the zeroing mode.

In one embodiment, when the first control signal G1/4 is at the high level, the first group of switches is turned ON and the second group of switches is turned OFF, the first amplifier AMP1 is configured to operate in the output mode. The output terminal of the first amplifier AMP1 is coupled to the gate terminal of the output transistor Q, the inverting terminal of the first amplifier AMP1 is coupled to the source terminal of the output transistor Q. When the second control signal G2/3 is at the high level, the second group of switches is turned ON and the first group of switches is turned OFF, the second amplifier AMP2 is configured to operate in the output mode. The output terminal of the second amplifier AMP2 is coupled to the gate terminal of the output transistor Q, the inverting terminal of the second amplifier AMP2 is coupled to the source terminal of the output transistor Q.

As shown in FIG. 6, since the current sensing circuit 401 is connected in low side sensing way, a little common mode noise can be introduced when the two amplifiers AMP1 and AMP2 operate. In addition, the current sensing circuit 401 is coupled to the reference ground, which is more convenient for data process than the differential current sensing shown in FIG. 4. Furthermore, according to the present invention, the first amplifier AMP1 and the second amplifier AMP2 are configured to operate in one of the output mode and the zeroing mode under the control of the first control signal G1/4 and the second control signal G2/3, the bidirectional current can be sensed precisely due to the zero-offset feature of the two amplifiers.

Figure 8:
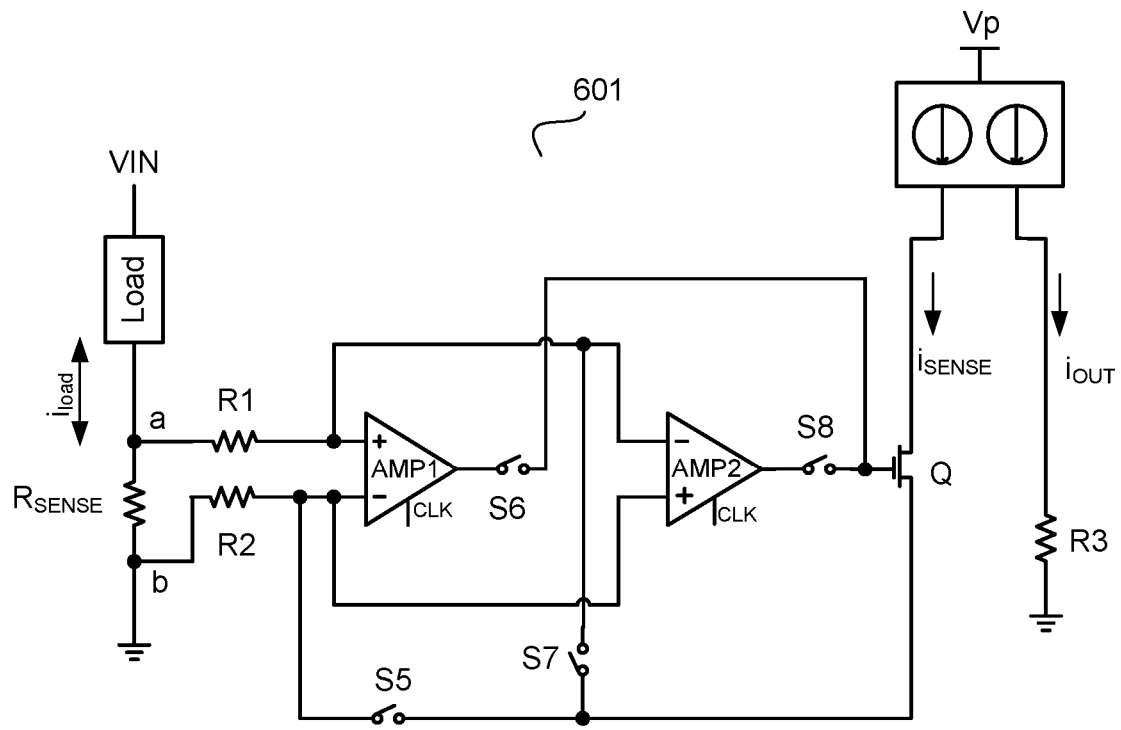
FIG. 8 schematically illustrates a current sensing circuit 601 in accordance with another embodiment of the present invention.

FIG. 8 schematically illustrates a current sensing circuit 601 in accordance with another embodiment of the present invention. The current sensing circuit 601 can be used in such application that requires sensing a bidirectional current, such as battery fuel gauge.

In the embodiment of FIG. 8, the current sensing circuit 601 is coupled to a load and configured to sense a bidirectional load current $i_{LOAD}$. The current sensing circuit 601 comprises a sensing resistor $R_{SENSE}$, a first auto-zero amplifier AMP1, a second auto-zero amplifier AMP2 and an output transistor Q. The sensing resistor $R_{SENSE}$ has a terminal "a" coupled to the load and a terminal "b" coupled to a reference ground. The first auto-zero amplifier AMP1 and the second auto-zero amplifier AMP2 are both coupled to the sensing resistor $R_{SENSE}$ to sense the voltage across the sensing resistor $R_{SENSE}$. The output transistor Q is configured to provide a path to output a current sensing signal $i_{SENSE}$ indicating a load current $i_{LOAD}$.

When the voltage across the sensing resistor $R_{SENSE}$ is positive, the first auto-zero amplifier AMP1 is configured to operate in an output mode and is electrically connected to the output transistor Q to provide the current sensing signal $i_{SENSE}$, the second auto-zero amplifier AMP2 is configured to operate in a zeroing mode and is disconnected from the output transistor Q, when the voltage across the sensing resistor $R_{SENSE}$ is negative, the second auto-zero amplifier AMP2 is configured to operate in the output mode and is electrically connected to the output transistor Q to provide the current sensing signal $i_{SENSE}$, the first auto-zero amplifier AMP1 is configured to operate in the zeroing mode and is disconnected from the output transistor Q.

In one embodiment, the current sensing circuit 601 further comprises a voltage polarity indicating circuit having an output terminal configured to provide a square signal as an indication as to whether the voltage across the sensing resistor is positive or negative. In one embodiment, the voltage polarity indicating circuit comprises a comparator. The comparator has a first input terminal coupled to the terminal "a" of the sensing resistor $R_{SENSE}$, a second input terminal coupled to the terminal "b" of the sensing resistor $R_{SENSE}$, and an output terminal configured to provide the square signal based on the comparison of the voltage Va at the terminal "a" of the sensing resistor $R_{SENSE}$ and the voltage Vb at the terminal "b" of the sensing resistor $R_{SENSE}$. A person of ordinary skill in the art should know that in other embodiments, the voltage polarity indicating circuit may have different circuit configurations while having the same or similar function.

The first auto-zero amplifier AMP1 has a non-inverting terminal, an inverting terminal a clock input terminal and an output terminal, wherein the non-inverting terminal is coupled to the terminal "a" of the sensing resistor $R_{SENSE}$ through a first resistor R1, the inverting terminal is coupled to the terminal "b" of the sensing resistor $R_{SENSE}$ through a second resistor R2, the clock input terminal is coupled to the output terminal of the voltage polarity indicating circuit. The second auto-zero amplifier AMP2 has a non-inverting terminal, an inverting terminal, a clock input terminal and an output terminal, wherein the inverting terminal is coupled to the non-inverting terminal of the first auto-zero amplifier AMP1, the non-inverting terminal is coupled to the inverting terminal of the first auto-zero amplifier AMP1, the clock input terminal is coupled to the output terminal of the voltage polarity indicating circuit through an inverter. One of the first and second auto-zero amplifiers AMP1 and AMP2 is configured to operate in an output mode and the other of the first and second auto-zero amplifiers AMP1 and AMP2 is configured to operate in a zeroing mode according to the voltage polarity of the voltage across the sensing resistor $R_{SENSE}$.

The output transistor Q has a drain terminal, a source terminal and a gate terminal, wherein the drain terminal is coupled to an output circuit 402, the source terminal is electrically connected to the inverting terminal of the one of the first and second auto-zero amplifiers AMP1 and AMP2 operating in the output mode, the gate terminal is electrically connected to the output terminal of the one of the first and second auto-zero amplifiers AMP1 and AMP2 operating in the output mode.

In the embodiment in FIG. 8, the current sensing circuit 601 further comprises a switch array. The switch array comprises a first group of switches (S5 and S6) and a second group of switches (S7 and S8). In one embodiment, when the voltage Va is higher than the voltage Vb, the first group of switches is tuned ON and the second group of switches is turned OFF. When the voltage Va is smaller than the voltage Vb, the second group of switches is tuned ON and the first group of switches is turned OFF.

Figure 9:
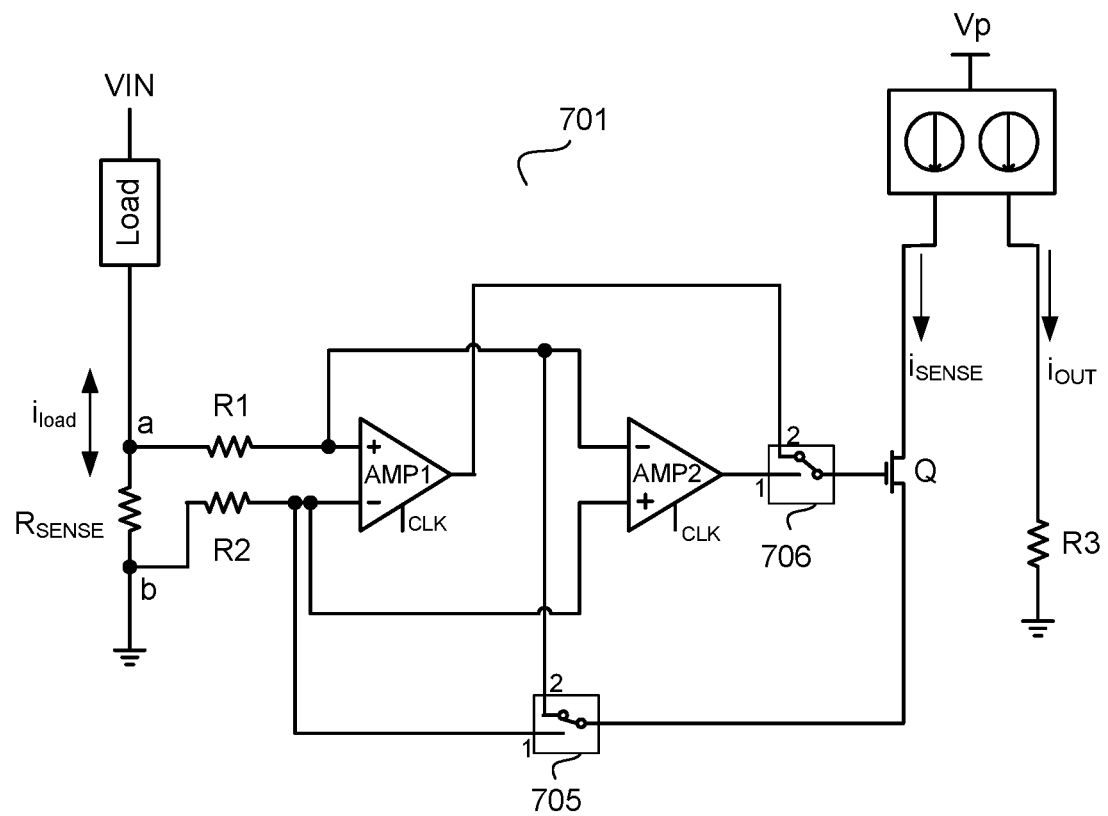
FIG. 9 schematically illustrates a current sensing circuit 701 in accordance with still another embodiment of the present invention.

FIG. 9 schematically illustrates a current sensing circuit 701 in accordance with still another embodiment of the present invention. In the embodiment of FIG. 9, the switch array comprises a first selector 705 and a second selector 706.

When the voltage Va is higher than the voltage Vb, the first auto-zero amplifier AMP1 is configured to operate in the output mode. The first selector 705 switches the connection from "2" to "1", that means the inverting terminal of the second auto-zero amplifier AMP2 is disconnected from the source terminal of the output transistor Q, and the inverting terminal of the first auto-zero amplifier AMP1 is connected to the source terminal of the output transistor Q. The second selector 706 switches the connection from "2" to "1", that means the output terminal of the first auto-zero amplifier AMP1 is connected to the gate terminal of the output transistor Q, the output terminal of the second auto-zero amplifier AMP2 is disconnected from the gate terminal of the output transistor Q.

When the voltage Va is smaller than Vb, the second auto-zero amplifier AMP2 is configured to operate in the output mode. The first selector 705 switches the connection from "1" to "2", that means the inverting terminal of the first amplifier AMP1 is disconnected from the source terminal of the output transistor Q, and the inverting terminal of the second auto-zero amplifier AMP2 is connected to the source terminal of the output transistor Q. The second selector 706 switches the connection from "1" to "2", that means the output terminal of the second auto-zero amplifier AMP2 is connected to the gate terminal of the output transistor Q, the output terminal of the first auto-zero amplifier AMP1 is disconnected from the gate terminal of the output transistor Q.

Figure 10:
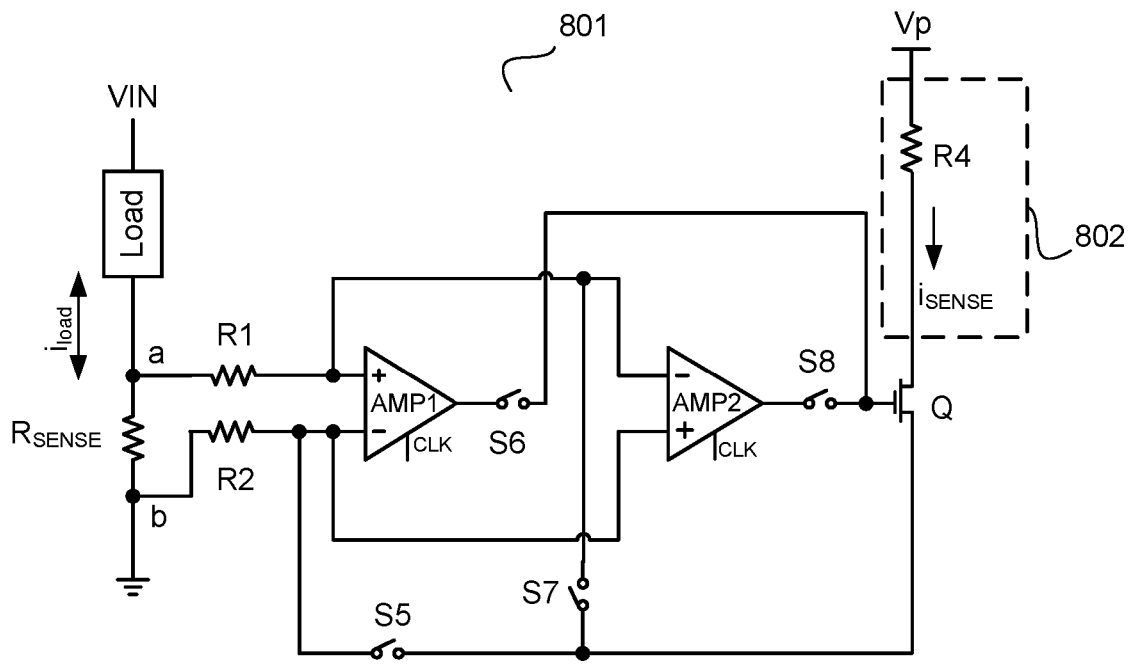
FIG. 10 schematically illustrates a current sensing circuit 801 in accordance with yet another embodiment of the present invention.

FIG. 10 schematically illustrates a current sensing circuit 801 in accordance with yet another embodiment of the present invention. In the embodiment of FIG. 10, the output circuit 802 comprises a resistor R4. The resistor R4 has a first terminal and a second terminal, wherein the first terminal is coupled to a power supply Vp, and the second terminal is coupled to the drain terminal of the output transistor Q. The voltage across the resistor R4 is used as a feedback signal related to the load current $i_{LOAD}$ and can be directly provided to the control loop.

From the foregoing, it will be appreciated that specific embodiments of the present invention have been described herein for purposes of illustration, but that various modifications may be made without deviating from the spirit and scope of various embodiments of the present invention. Many of the elements of one embodiment may be combined with other embodiments in addition to or in lieu of the elements of the other embodiments. Accordingly, the present invention is not limited except as by the appended claims.

What is claimed is:

1. A bidirectional current sensing circuit for sensing load current of an H-bridge circuit, wherein the H-bridge circuit comprises a first switch pair controlled by a first control signal and a second switch pair controlled by a second control signal, the H-bridge circuit is configured to drive a load by alternatively turning-ON and turning-OFF the first switch pair and the second switch pair, the bidirectional current sensing circuit comprising:

a sensing resistor, having a first terminal coupled to the load, and a second terminal coupled to a reference ground;

a first amplifier, having a non-inverting terminal coupled to the first terminal of the sensing resistor through a first resistor, an inverting terminal coupled to the second terminal of the sensing resistor through a second resistor, a clock input terminal coupled to the first control signal, and an output terminal, wherein the first amplifier is configured to operate in one of an output mode and a zeroing mode based on the first control signal;

a second amplifier, having a non-inverting terminal coupled to the inverting terminal of the first amplifier, an inverting terminal coupled to the non-inverting terminal of the first amplifier, a clock input terminal coupled to the second control signal, and an output terminal, wherein the second amplifier is configured to operate in one of the output mode and the zeroing mode based on the second control signal; and an output transistor, having a first terminal coupled to an output circuit to provide a current sensing signal indicating the load current, a second terminal electrically connected to the inverting terminal one of the first and second amplifiers operating in the output mode, and a control terminal electrically connected to the output terminal of the one of the first and second amplifiers operating in the output mode.

2. The bidirectional current sensing circuit of claim 1, further comprises a first group of switches and a second group of switches, wherein:

when the first control signal is valid, and the second control signal is invalid, the first group of switches is turned ON and the second group of switches is turned OFF, wherein the output terminal of the first amplifier is electrically connected to the control terminal of the output transistor, and the inverting terminal of the first amplifier is electrically connected to the second terminal of the output transistor; and when the second control signal is valid, and the first control signal is invalid, the second group of switches is turned ON and the first group of switches is turned OFF, wherein the output terminal of the second amplifier is electrically connected to the control terminal of the output transistor, and the inverting terminal of the second amplifier is electrically connected to the second terminal of the output transistor.

3. The bidirectional current sensing circuit of claim 2, wherein:

the first group of switches comprises a fifth switch and a sixth switch, a first terminal of the fifth switch is coupled to the inverting terminal of the first amplifier, a second terminal of the fifth switch is coupled to the second terminal of the output transistor, a first terminal of the sixth switch is coupled to the output terminal of the first amplifier, a second terminal of the sixth switch is coupled to the control terminal of the output transistor, a control terminal of the fifth switch and a control terminal of the sixth switch are coupled to the first control signal; and the second group of switches comprises a seventh switch and an eighth switch, a first terminal of the seventh switch is coupled to the inverting terminal of the second amplifier, a second terminal of the seventh switch is coupled to the second terminal of the output transistor, a first terminal of the eighth switch is coupled to the output terminal of the second amplifier, a second terminal of the eighth switch is coupled to the control terminal of the output transistor, a control terminal of the seventh switch and a control terminal of the eighth switch are coupled to the second control signal.

4. The bidirectional current sensing circuit of claim 1, further comprises a first selector and a second selector, wherein:

in the output mode of the first amplifier, the first selector is configured to disconnect the inverting terminal of the second amplifier from the second terminal of the output transistor and connect the inverting terminal of the first amplifier to the second terminal of the output transistor, the second selector is configured to connect the output terminal of the first amplifier to the control terminal of the output transistor and disconnect the output terminal of the second amplifier from the control terminal of the output transistor; and in the output mode of the second amplifier, the first selector is configured to disconnect the inverting terminal of the first amplifier from the second terminal of the output transistor and connect the inverting terminal of the second amplifier to the second terminal of the output transistor, the second selector is configured to connect the output terminal of the second amplifier to the control terminal of the output transistor and disconnect the output terminal of the first amplifier from the control terminal of the output transistor.

5. The bidirectional current sensing circuit of claim 1, wherein the output circuit comprises:

a current mirror circuit, having an input terminal coupled to the first terminal of the output transistor, a power terminal coupled to a first power supply, and an output terminal coupled to the reference ground through a third resistor.

6. The bidirectional current sensing circuit of claim 1, wherein the output circuit comprises:

a fourth resistor, having a first terminal coupled to the first terminal of the output transistor and a second terminal coupled to a second power supply.

7. The bidirectional current sensing circuit of claim 1, wherein all the components of the bidirectional current sensing circuit are integrated in one chip.

8. The bidirectional current sensing circuit of claim 1, wherein every component of the bidirectional current sensing circuit is integrated in one chip except for the sensing resistor.

9. The bidirectional current sensing circuit of claim 1, wherein the first control signal and the second control signal are logic complementary.

10. A bidirectional current sensing circuit, comprising:

a sensing resistor, having a first terminal coupled to a load and a second terminal coupled to a reference ground;

a voltage polarity indicating circuit, having an output terminal configured to provide a square signal as an indication as to whether a voltage across the sensing resistor is positive or negative;

a first auto-zero amplifier, having a non-inverting terminal coupled to the first terminal of the sensing resistor through a first resistor, an inverting terminal coupled to the second terminal of the sensing resistor through a second resistor, a clock input terminal coupled to the output terminal of the voltage polarity indicating circuit, and an output terminal;

a second auto-zero amplifier, having a non-inverting terminal coupled to the inverting terminal of the first auto-zero amplifier, an inverting terminal coupled to the non-inverting terminal of the first auto-zero amplifier, a clock input terminal coupled to the output terminal of the voltage polarity indicating circuit through an inverter, and an output terminal, wherein one of the first and second auto-zero amplifiers is configured to operate in an output mode and the other of the first and second auto-zero amplifiers is configured to operate in a zeroing mode according to the voltage polarity of the voltage across the sensing resistor; and an output transistor, having a first terminal coupled to an output circuit to provide a current sensing signal indicating the load current, a second terminal electrically connected to the inverting terminal of the one of the first and second auto-zero amplifiers operating in the output mode, and a control terminal electrically connected to the output terminal of the one of the first and second auto-zero amplifiers operating in the output mode.

11. The bidirectional current sensing circuit of claim 10, wherein when the voltage across the sensing resistor is positive, the first auto-zero amplifier is configured to operate in the output mode and the second auto-zero amplifier is configured to operate in the zeroing mode; and when the voltage across the sensing resistor is negative, the second auto-zero amplifier is configured to operate in the output mode and the first auto-zero amplifier is configured to operate in the zeroing mode.

12. The bidirectional current sensing circuit of claim 10, wherein the voltage polarity indicating circuit comprises:

a comparator, having a first input terminal coupled to the first terminal of the sensing resistor, a second input terminal is coupled to the second terminal of the sensing resistor, and an output terminal configured to provide the square signal based on the comparison of the voltage at the first terminal of the sensing resistor and the voltage at the second terminal of the sensing resistor.

13. The bidirectional current sensing circuit of claim 10, further comprises a first group of switches and a second group of switches, and wherein when the first auto-zero amplifier is configured to operate in the output mode, the first group of switches is turned ON and the second group of switches is turned OFF, and when the second auto-zero amplifier is configured to operate in the output mode, the second group of switches is turned ON and the first group of switches is turned OFF.

14. The bidirectional current sensing circuit of claim 13, wherein:

the first group of switches comprises a fifth switch and a sixth switch, a first terminal of the fifth switch is coupled to the inverting terminal of the first auto-zero amplifier, a second terminal of the fifth switch is coupled to the second terminal of the output transistor, a first terminal of the sixth switch is coupled to the output terminal of the first auto-zero amplifier, a second terminal of the sixth switch is coupled to the control terminal of the output transistor, a control terminal of the fifth switch and a control terminal of the sixth switch are coupled to the output terminal of the comparator; and the second group of switches comprises a seventh switch and an eighth switch, a first terminal of the seventh switch is coupled to the inverting terminal of the second auto-zero amplifier, a second terminal of the seventh switch is coupled to the second terminal of the output transistor, a first terminal of the eighth switch is coupled to the output terminal of the second auto-zero amplifier, a second terminal of the eighth switch is coupled to the control terminal of the output transistor, a control terminal of the seventh switch and a control terminal of the eighth switch are coupled to the output terminal of the comparator through the inverter.

15. The bidirectional current sensing circuit of claim 10, further comprises a first selector and a second selector, wherein:

in the output mode of the first auto-zero amplifier, the first selector is configured to disconnect the inverting terminal of the second auto-zero amplifier from the second terminal of the output transistor and connect the inverting terminal of the first auto-zero amplifier to the second terminal of the output transistor, the second selector is configured to connect the output terminal of the first auto-zero amplifier to the control terminal of the output transistor and disconnect the output terminal of the second auto-zero amplifier from the control terminal of the output transistor; and in the output mode of the second auto-zero amplifier, the first selector is configured to disconnect the inverting terminal of the first auto-zero amplifier from the second terminal of the output transistor and connect the inverting terminal of the second auto-zero amplifier to the second terminal of the output transistor, the second selector is configured to connect the output terminal of the second auto-zero amplifier to the control terminal of the output transistor and disconnect the output terminal of the first auto-zero amplifier from the control terminal of the output transistor.

16. The bidirectional current sensing circuit of claim 10, wherein the output circuit comprises:

a current mirror circuit, having an input terminal coupled to the first terminal of the output transistor, a power terminal coupled to a first power supply, and an output terminal coupled to the reference ground through a third resistor.

17. The bidirectional current sensing circuit of claim 10, wherein the output circuit comprises:

a fourth resistor, having a first terminal coupled to the first terminal of the output transistor and a second terminal coupled to a second power supply.

18. The bidirectional current sensing circuit of claim 10, wherein all the components of the bidirectional current sensing circuit are integrated in one chip.

19. The bidirectional current sensing circuit of claim 10, wherein every component of the bidirectional current sensing circuit is integrated in one chip except for the sensing resistor.

* * * * *